(12) United States Patent
Yamamoto et al.

(10) Patent No.: US 6,849,030 B2
(45) Date of Patent: Feb. 1, 2005

(54) HYDRAULIC PRESSURE CONTROL FOR CONTINUOUSLY VARIABLE TRANSMISSION

(75) Inventors: Masahiro Yamamoto, Fuji (JP); Midori Yamaguchi, Fuji (JP)

(73) Assignee: JATCO Ltd, Fuji (JP)

( * ) Notice: Subject to any disclaimer, the term of this patent is extended or adjusted under 35 U.S.C. 154(b) by 0 days.

(21) Appl. No.: 10/650,084

(22) Filed: Aug. 28, 2003

(65) Prior Publication Data
US 2004/0063538 A1 Apr. 1, 2004

(30) Foreign Application Priority Data
Aug. 30, 2002 (JP) ........................................ 2002-255742

(51) Int. Cl.$^7$ ............................................. B60K 41/16
(52) U.S. Cl. ........................... 477/159; 477/45; 477/46; 477/127
(58) Field of Search ........................... 477/45, 46, 127, 477/156, 158, 159

(56) References Cited

U.S. PATENT DOCUMENTS 5,445,577 A * 8/1995 Fujita et al. ................ 477/120
5,665,029 A * 9/1997 Minowa et al. ............. 477/168
5,667,457 A * 9/1997 Kuriyama et al. .......... 477/156

FOREIGN PATENT DOCUMENTS

| JP | 06-17914 | * | 1/1994 | .................. 477/46 |
| JP | 9-329229 A | | 12/1997 | |
| JP | 2000-18347 | * | 1/2000 | |

* cited by examiner

Primary Examiner—Ha Ho
(74) Attorney, Agent, or Firm—Foley & Lardner LLP

(57) ABSTRACT

A belt type continuously variable transmission (CVT) (10) for a vehicle varies the speed ratio in accordance with the hydraulic pressure that is regulated via a hydraulic pressure regulating unit (30). A sensor (27) detects a vehicle speed. A CVT controller (20) calculates a target hydraulic pressure that is supplied to the CVT (10) on the basis of a predetermined speed change schedule so that the speed ratio varies in the direction of up-shifting as the vehicle speed increases (S15). The CVT controller (20) also determines whether or not a specified condition holds (S16, S160), and controls the hydraulic pressure regulating unit according to a target start-up hydraulic pressure which is larger than a target hydraulic pressure for normal running (S11, S13), thereby preventing a speed change lag when the vehicle starts to move.

11 Claims, 12 Drawing Sheets

24 ACCELERATOR PEDAL DEPRESSION SENSOR
26 ROTATION SPEED SENSOR
27 ROTATION SPEED SENSOR
28 PRESSURE SENSOR
29 ENGINE ROTATION SPEED SENSOR
30 HYDRAULIC PRESSURE REGULATING UNIT
41 THROTTLE OPENING SENSOR

HYDRAULIC PRESSURE CONTROL FOR CONTINUOUSLY VARIABLE TRANSMISSION

FIELD OF THE INVENTION

This invention relates to the control of the hydraulic pressure supplied to a continuously variable transmission for a vehicle.

BACKGROUND OF THE INVENTION

Continuously variable transmissions (CVT) for vehicles for example comprise a primary pulley which inputs the rotation of the engine, a secondary pulley which outputs this rotation to the drive wheels, and a V-belt which transmits the rotation of the primary pulley to the secondary pulley.

In such a CVT, the ratio of the rotational speeds of the primary pulley and secondary pulley, i.e., the speed ratio, is continuously varied by using hydraulic pressure to vary the ratio of the contact radius of the V-belt with the primary pulley and the contact radius of the V-belt with the secondary pulley.

Tokkai Hei 9-329229 issued by the Japan Patent Office in 1997 discloses a slight correction of the target speed ratio of the transmission in the direction of decrease, i.e., in the up-shift direction, immediately after the vehicle has started to move in order to achieve smooth start-up of the vehicle.

SUMMARY OF THE INVENTION

However, providing that the pressure receiving areas of the primary pulley and secondary pulley that receive the hydraulic pressure are almost the same, the difference in thrust force required for up-shifting is difficult to generate between the pulleys in the abovementioned control, so that a speed change lag in the transmission occurs when the vehicle starts to move.

Furthermore, in cases where the target speed change rate is dynamically calculated from the speed change schedule and throttle opening of the engine, and the primary pressure is set in accordance with the target speed change rate, there is a delay caused by the smoothing processing such as filter processing or the like in the calculation of the target speed change rate. As a result, the setting of the primary pressure tends to be inadequate immediately after the initiation of a gear shift. This fact is also a cause of a speed change lag when the vehicle starts to move.

It is therefore an object of this invention to prevent the speed change lag from occurring in a CVT when vehicles start to move.

In order to achieve the above object, this invention provides a hydraulic pressure control device for such a continuously variable transmission for a vehicle that varies a speed ratio at a speed change rate corresponding to a hydraulic pressure. The device comprises a programmable controller programmed to calculate a target speed change rate according to a predetermined speed change schedule in which the speed ratio varies in an up-shift direction as a vehicle speed increases, determine after the vehicle has started to move whether or not a specified condition holds, control the hydraulic pressure supplied to the transmission, when the specified condition holds, to a pressure corresponding to the target speed change rate, and control the hydraulic pressure supplied to the transmission, when the specified condition does not hold, to a pressure corresponding to a target start-up speed change rate which is larger than the target speed change rate.

It is preferable that the device further comprises a hydraulic pressure regulating unit which varies the hydraulic pressure supplied to the transmission and a sensor which detects a vehicle speed.

This invention also provides a hydraulic pressure control method for such a continuously variable transmission for a vehicle that varies a speed ratio at a speed change rate corresponding to a hydraulic pressure. The method comprises calculating a target speed change rate according to a predetermined speed change schedule in which the speed ratio varies in an up-shift direction as a vehicle speed increases, determining after the vehicle has started to move whether or not a specified condition holds, controlling the hydraulic pressure supplied to the transmission, when the specified condition holds, to a pressure corresponding to the target speed change rate, and controlling the hydraulic pressure supplied to the transmission, when the specified condition does not hold, to a pressure corresponding to a target start-up speed change rate which is larger than the target speed change rate.

BRIEF DESCRIPTION OF THE DRAWINGS

The details as well as other features and advantages of this invention are set forth in the remainder of the specification and are shown in the accompanying drawings.

DESCRIPTION OF THE PREFERRED EMBODIMENTS

Figure 1:
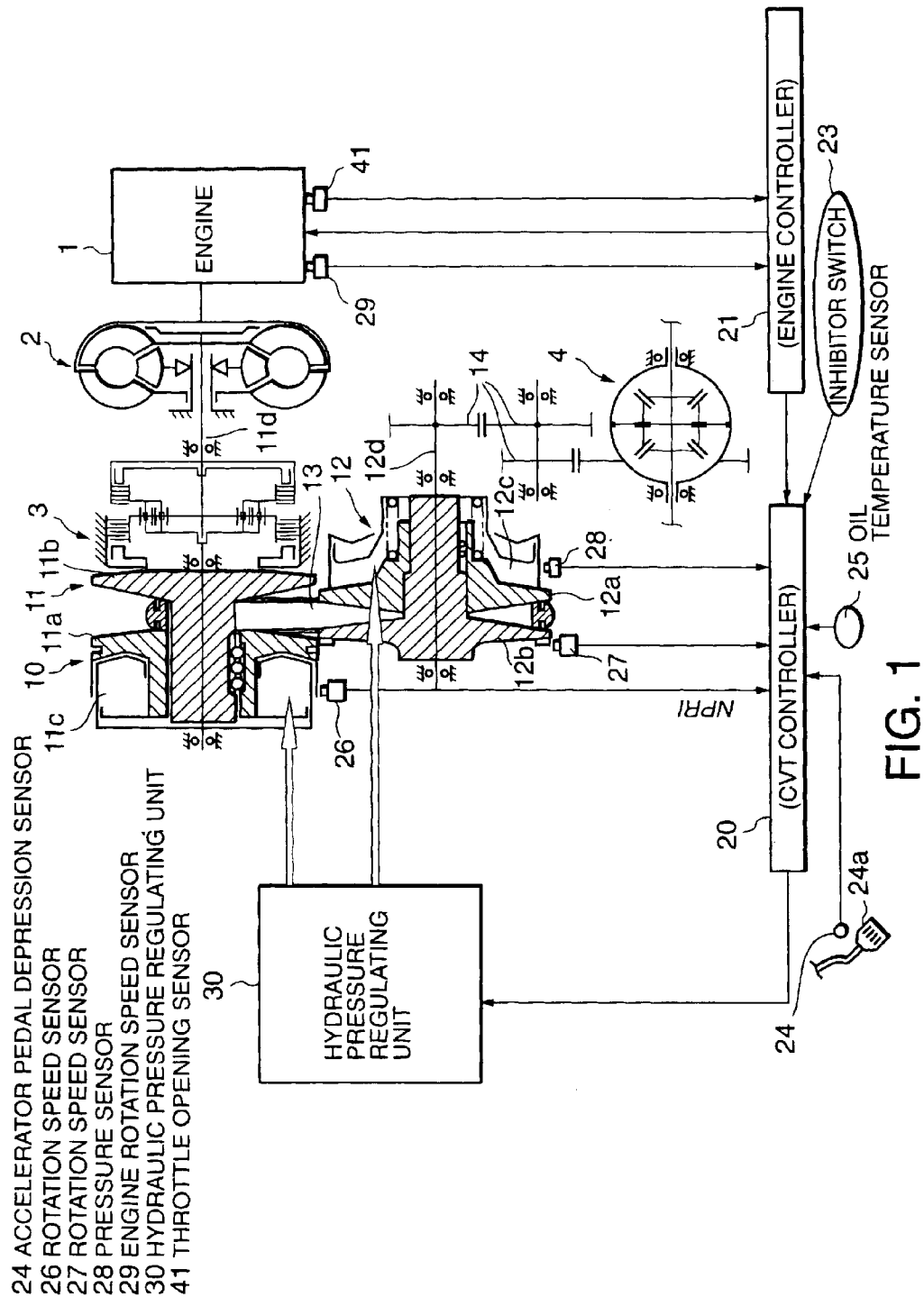
FIG. 1 is a schematic diagram of a hydraulic pressure control device of a continuously variable transmission (CVT) according to this invention.

Referring to FIG. 1 of the drawings, a belt CVT 10 for a vehicle comprises a primary pulley 11, a secondary pulley 12, and a V-belt 13 which is wrapped around the pulleys 11 and 12.

The rotation of an engine 1 is input to the primary pulley 11 via a torque converter 2 equipped with a lock-up clutch, and a forward/reverse change-over mechanism 3. The primary pulley 11 comprises a fixed conical plate 11b which rotates together with an input shaft 11d, and a movable conical plate 11a which is disposed facing the fixed conical plate 11b. The fixed conical plate 11b and movable conical plate 11a form a V-shaped pulley groove, and the contact radius between the primary pulley 11 and V-belt 13 is continuously varied as a result of the width of the pulley groove being varied by the movable conical plate 11a, which displaces towards or away from the fixed conical plate 11b in response to the hydraulic pressure supplied to a primary pulley cylinder chamber 11c (hereinafter referred to as a primary pressure.)

The V-belt 13 transmits the rotation of the primary pulley 11 to the secondary pulley 12.

The secondary pulley 12 outputs the rotation transmitted by the V-belt 13 to a differential 4 via an idler gear 14. The secondary pulley 12 comprises a fixed conical plate 12b which rotates together with an output shaft 12d, and a movable conical plate 12a which is disposed facing the fixed conical plate 12b. The fixed conical plate 12b and movable conical plate 12a form a V-shaped pulley groove, and the contact radius between the secondary pulley 12 and the V-belt 13 is continuously varied as a result of the width of the pulley grove being varied by the movable conical plate 12a, which displaces towards or away from the fixed conical plate 12b in response to the hydraulic pressure supplied to a secondary pulley cylinder chamber 12c (hereinafter referred to as a secondary pressure).

A pressure receiving area of the secondary pulley 12 which faces the secondary pulley cylinder chamber 12c, is set equal to a pressure receiving area of the primary pulley 11 which faces the primary pulley cylinder chamber 11c.

The hydraulic pressures of the primary pulley cylinder chamber 11c and secondary pulley cylinder chamber 12c are controlled by a CVT controller 20 via a hydraulic pressure regulating unit 30. The operation of the engine 1 is controlled by an engine controller 21.

The CVT controller 20 and engine controller 21 are constructed by microcomputers respectively comprising central processing units (CPU), read-only memories (ROM), random access memories (RAM) and input-output interfaces (I/O interfaces). The CVT controller 20 may be constructed from a plurality of microcomputers, or the controllers 20 and 21 may be constructed from a single microcomputer.

In order to control the hydraulic pressure of the primary pulley cylinder chamber 11c and secondary pulley cylinder chamber 12c, respective detection data are input into the CVT controller 20 via a signal circuit from an inhibitor switch 23 which detects the selection range of a shift lever installed in the vehicle, an accelerator pedal depression sensor 24 which detects the depression amount of an accelerator pedal 24a installed in the vehicle, an oil temperature sensor 25 which detects the temperature of oil supplied to the primary pulley cylinder chamber 11c and secondary pulley cylinder chamber 12c, a rotation speed sensor 26 which detects the rotation speed of the primary pulley 11, a rotation speed sensor 27 which detects the rotation speed of the secondary pulley 12 and a pressure sensor 28 which detects the hydraulic pressure of the secondary pulley cylinder chamber 12c.

Furthermore, the rotation speed of the engine 1 is input into the CVT controller 20 via the engine controller 21 from an engine rotation speed sensor 29, and the throttle opening TV is input into the CVT controller 20 via the engine controller 21 from a throttle sensor 41 that detects the opening of the throttle of the engine 1. Since the running speed of the vehicle VS is proportional to the rotation speed of the secondary pulley 12, the rotation speed of the secondary pulley 12 also represents the running speed of the vehicle VS.

On the basis of the input signals and input torque information that is input from the engine controller 21, the CVT controller 20 determines a target speed ratio of the CVT 10, and frictional forces acting between the pulleys 11 and 12 and the V-belt 13. Furthermore, the CVT controller 20 calculates a target primary pressure and a target secondary pressure, and transmits corresponding command signals to the hydraulic pressure regulating unit 30.

On the basis of the command signals from the CVT controller 20, the hydraulic pressure regulating unit 30 supplies hydraulic pressure to the primary pulley cylinder chamber 11c and secondary pulley cylinder chamber 12c so that the primary pressure and secondary pressure are equal to the target values. As a result, the movable conical plate 11a is displaced along the input shaft 11d so as to vary the width of the pulley groove of the primary pulley 11. Furthermore, the movable conical plate 12a is displaced along the output shaft 12d so as to vary the width of the pulley groove of the secondary pulley 12.

As the respective pulley grooves vary, the contact radii between the V-belt 13 and the primary pulley 11 and secondary pulley 12 vary, so that the speed ratio of the belt CVT 10 and the frictional forces between the V-belt 13 and the respective pulleys 11 and 12 vary toward the target values set by the CVT controller 20.

Under the above control, the rotation of the engine 1 is input into the CVT 10 via the torque converter 2 and forward/reverse change-over mechanism 3, and is transmitted to the differential 4 from the primary pulley 11 via the V-belt 13 and secondary pulley 12.

Figure 2:
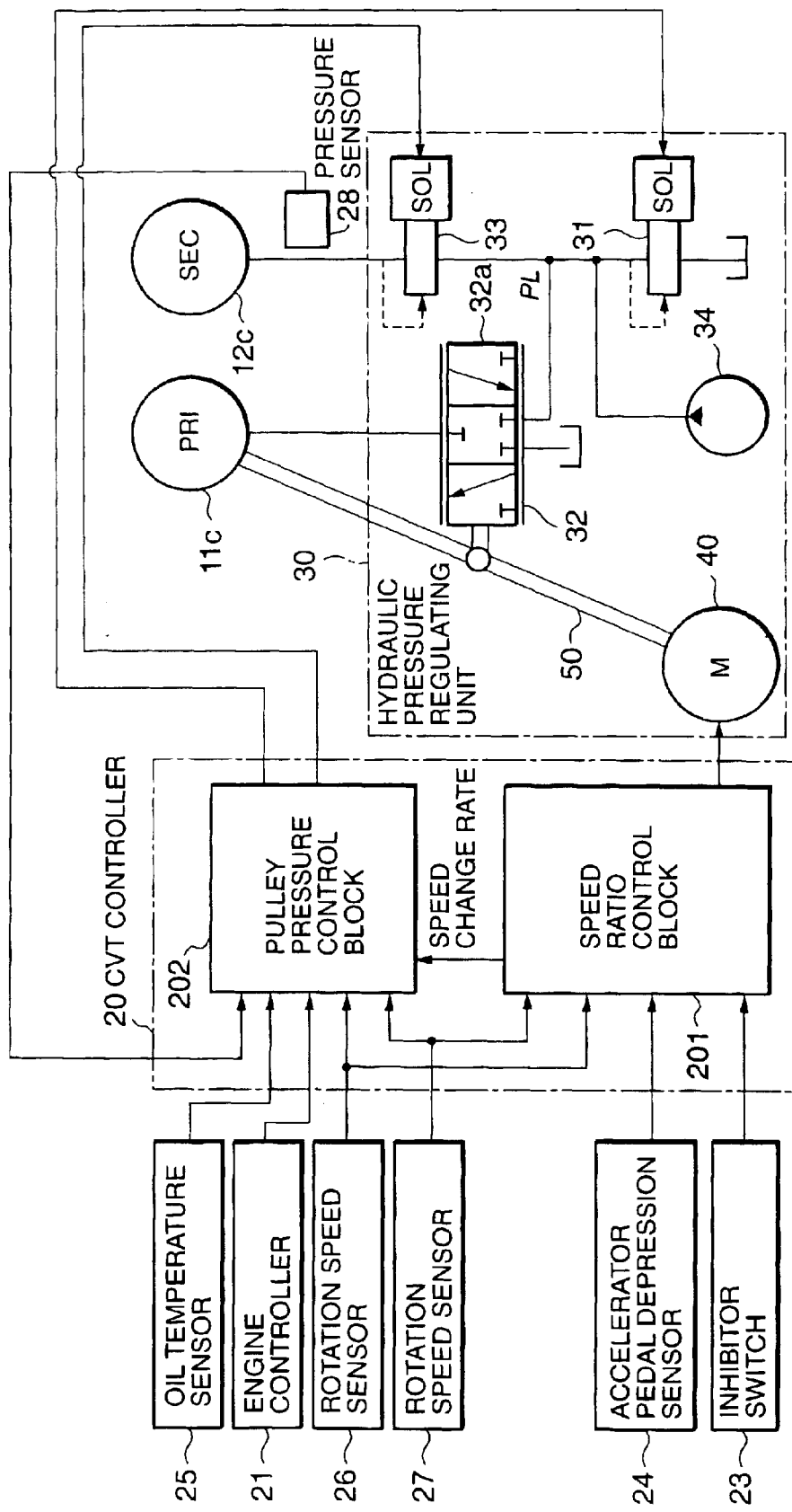
FIG. 2 is a block diagram illustrating the control content of the hydraulic pressure control device according to this invention.

Next, referring to FIG. 2, the abovementioned hydraulic pressure control by the CVT controller 20 and hydraulic pressure regulating unit 30 will be described.

The hydraulic pressure regulating unit 30 comprises a hydraulic pressure valve 34, a regulator valve 31, a speed change control valve 32, a pressure reduction valve 33, and a step motor 40.

The regulator valve 31 is a pressure regulating valve which regulates the pressure of the hydraulic fluid discharged by the hydraulic pressure pump 34 to a line pressure PL in accordance with a line pressure command signal from the CVT controller 20. The line pressure command signal is output as a duty signal, and the regulator valve 31 has a solenoid which responds to the duty signal.

The speed change control valve 32 is a valve which is used to cause the primary pressure to coincide with the target primary pressure. The speed change control valve 32 is constructed from a spool valve, and a servo link 50 is connected to the spool 32a. One end of the servo link 50 is connected to the step motor 40, and the other end of the servo link 50 is connected to the movable disk plate 11a of the primary pulley 11.

The speed change control valve 32 selectively connects the line pressure PL and a drain to the primary pulley cylinder chamber 11c by displacing the spool 32a in accordance with the rotation of the step motor 40. As a result, when the width of the pulley groove of the primary pulley 11 varies, this variation is fed back as displacement of the spool 32a via the servo link 50.

Using this mechanical feedback mechanism, the gearshift control valve 32 controls the primary pressure so as to realize the target speed ratio commanded by the CVT controller 20. Furthermore, after the speed change operation to the target speed ratio has been completed, the spool 32a is held in a blocking position that blocks the entry and exit of oil into and from the primary pulley cylinder chamber 11c by feedback from the servo link 50.

The pressure reduction valve 33 is used to cause the secondary pressure to coincide with the target secondary pressure.

The pressure reduction valve 33 has a solenoid which responds to a secondary pressure command signal input from the CVT controller 20, and reduces the line pressure PL to the target secondary pressure in accordance with the excitation of the solenoid.

After the discharge pressure of the hydraulic pressure pump 34 has been adjusted to the line pressure PL by the regulator valve 31, it is respectively supplied to the speed change control valve 32 and pressure reduction valve 33.

The CVT controller 20 comprises a speed ratio control block 201 which determines the target speed ratio, and drives the step motor 40 so that the speed ratio of the CVT 10 coincides with the target speed ratio, and a pulley pressure control block 202 which determines the respective target values of the line pressure, primary pressure and secondary pressure, corrects the target values as required, and outputs corresponding signals to the regulator valve 31 and pressure reduction valve 33. These blocks are virtual blocks for illustrating the respective functions of the controller, and do not exist physically.

Next, referring to FIGS. 3A and 3B, a hydraulic pressure control routine that is executed by the CVT controller 20 will be described. This routine is executed at intervals of ten milliseconds during the operation of the engine 1.

In the following description, the speed change rate takes a positive value when the speed ratio of the CVT 10 increases, i.e., when the CVT 10 is shifted down, and takes a negative value when the speed ratio of the CVT 10 decreases, i.e., when the CVT 10 is up-shifted.

Figure 4:
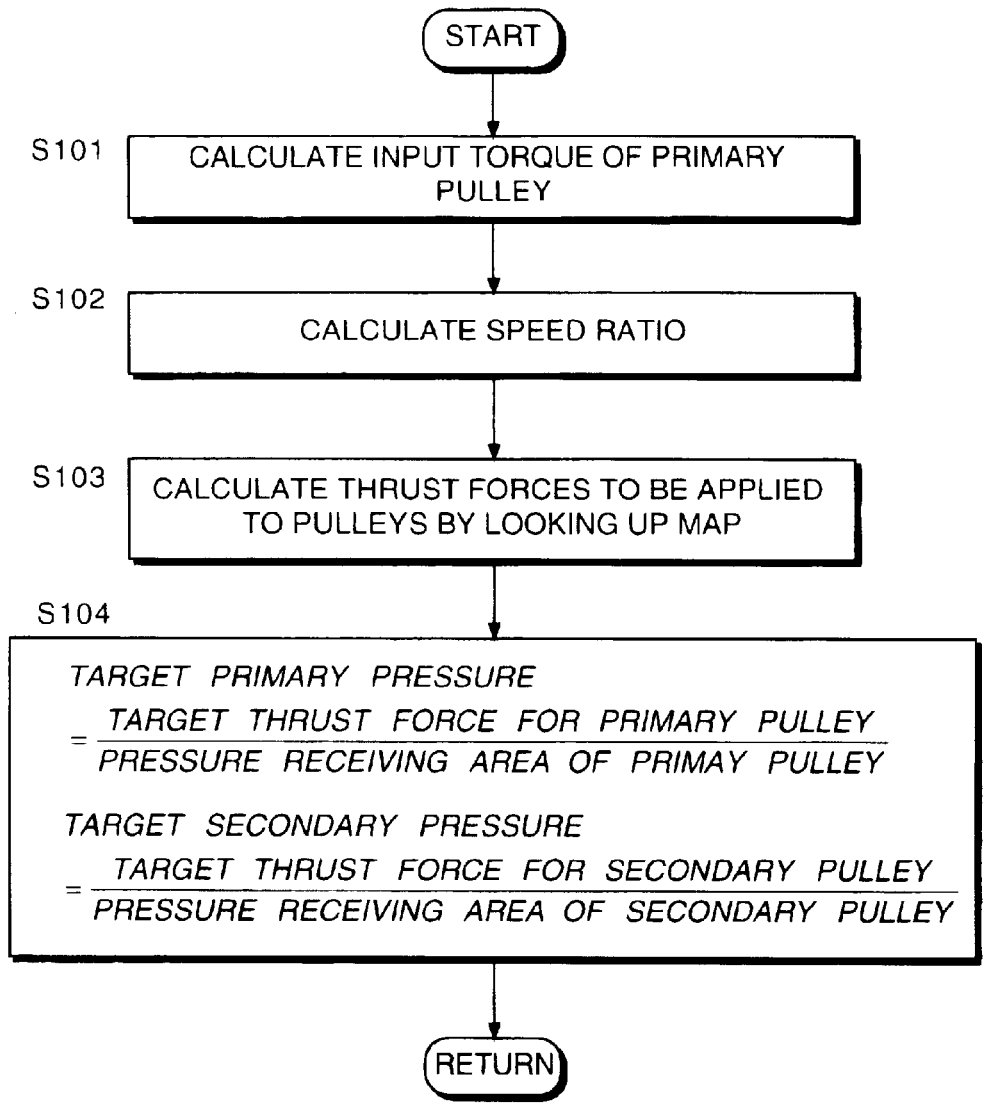
FIG. 4 is a flow chart describing a subroutine for calculating a target primary pressure and a target secondary pressure executed by the CVT controller.

First, in a step S1, the CVT controller 20 calculates the target primary pressure and the target secondary pressure by executing a subroutine shown in FIG. 4. This subroutine will be described later. The respective target values calculated here are pressures that are required to hold the pulleys 11, 12 such that the belt 13 does not slip over the pulleys 11, 12 while maintaining the current speed ratio, and are referred to as steady state pressures.

In a next step S2, the CVT controller 20 determines whether or not the vehicle is in a stationary mode. The stationary mode represents the state of the vehicle in which the vehicle speed VS is less than three kilometers per hour, and the rotation speed NPRI of the primary pulley 11 is less than two hundred revolutions per minute.

When the vehicle is in the stationary mode, in a step S3, the CVT controller 20 sets the target primary pressure correction amount at zero pascals.

On the other hand, when the vehicle is not in the stationary mode, in a step S5, the CVT controller 20 determines in step S5 as to whether or not speed ratio feedback control conditions hold.

It is determined that the conditions hold when all the following conditions are satisfied. Specifically, the vehicle speed is three kilometers per hour or greater, the rotational speed NPRI of the primary pulley 11 is two hundred revolutions per minute or greater, and neither the oil temperature sensor 25 nor the engine rotational speed sensor 29 show abnormalities.

When any of these conditions are not satisfied, it is determined that the speed ratio feedback control conditions do not hold.

When the vehicle is not in the stationary mode, and the speed ratio feedback control conditions do not hold, it denotes that some irregularities have occurred in the vehicle drive system. In this case, in a step S18, the CVT controller 20 sets the target primary pressure correction amount at five thousand Newtons/pressure receiving area. The pressure receiving area is the pressure receiving area of the primary pulley 11 that faces the primary pulley cylinder chamber 11c.

When the speed ratio feedback control conditions hold in the step S5, the CVT controller 20 determines in a step S6 whether or not the vehicle is in a start-up mode. The start-up mode represents the state of the vehicle in which the actual speed ratio of the CVT 10 calculated from the speed detected by the rotational speed sensors 26 and 27 is in a specified range from the maximum speed ratio of the CVT.

Figure 10:
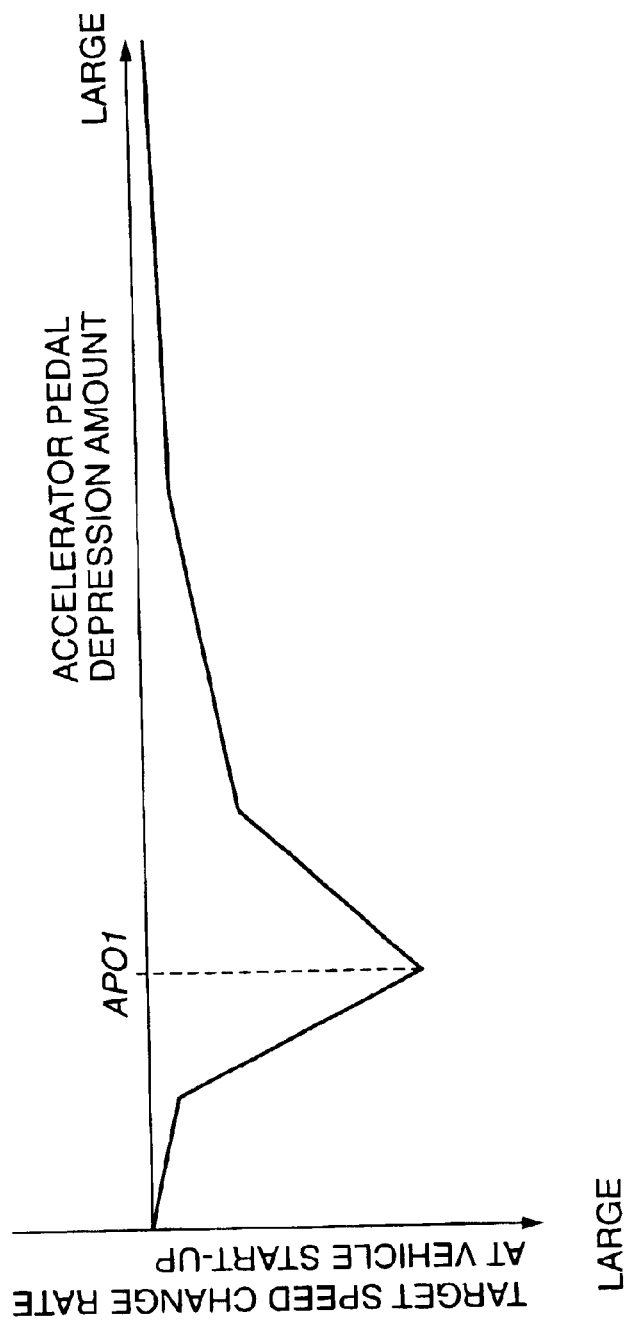
FIG. 10 is a diagram illustrating the characteristics of a map of a target start-up speed change rate stored by the CVT controller.

When the vehicle is in the start-up mode, in a step S8, the CVT controller 20 calculates a target start-up speed change rate from the accelerator pedal depression amount by referring to a map having the characteristics shown in FIG. 10. The map is prestored in the memory (ROM) of the controller 40. The target start-up speed change rate denotes a target speed change rate when the vehicle starts to move.

Referring to FIG. 10, the target start-up speed change rate shows a negative peak value at a specified accelerator pedal depression amount APO1 which is close to zero. Subsequently, the target speed change rate approaches zero as the accelerator pedal depression amount increases. Since the speed ratio varies in the direction of reduction when the vehicle starts to move, the target start-up speed change rate is expressed as a negative value, as was described above.

When the accelerator pedal depression amount is large, the output torque of the engine 1 is also large. As a result, the acceleration of the vehicle becomes large, but the vehicle speed at which upshifting is performed also becomes large. In other words, the period during which the CVT 10 stays in a large speed ratio is prolonged, so the speed change lag due to a delay in the stand-by of the hydraulic pressure is not likely to occur.

According to this invention, the primary pressure is corrected in the direction of increase as the absolute value of the target start-up speed change rate increases. This criterion will be described later in detail.

If the target start-up speed change rate is close to zero while the speed change lag is not likely to occur, the correction amount of the primary pressure is small. By setting the target start-up speed change rate to approach zero as the accelerator pedal depression amount increases, the correction amount of the primary pressure in the direction of increase is suppressed to a small value in a region where the speed change lag is not likely to occur. Such a criterion for setting the target start-up speed change rate is preferred in view of suppressing unnecessary fuel consumption in the region where the speed change lag is not likely to occur.

On the other hand, when the accelerator pedal depression amount is smaller than the specified peak amount APO1, the target start-up speed change rate approaches zero as the accelerator pedal depression amount decreases. In this region, up-shifting is performed at a low vehicle speed.

However, since the accelerator pedal depression amount is small, and both the output torque of the engine and the acceleration of the vehicle are also small, the time until up-shift operation is required is long. As a result, the period for which the CVT 10 remains in a state of a large speed ratio is prolonged, so that a speed change lag caused by a stand-by delay in the hydraulic pressure tends not to occur.

Accordingly, it is desirable that the target start-up speed change rate approaches zero as the accelerator pedal depression amount decreases in terms of suppressing an increase in fuel consumption in a region in which a speed change lag tends not to occur.

The specified accelerator pedal depression amount APO1 is set at an amount with which the speed ratio of the CVT 10 is largely up-shifted at an early stage.

A considerable effect can be also be obtained by an arrangement in which the target start-up speed change rate in the region where the accelerator pedal depression amount is greater than zero but not larger than the specified accelerator pedal depression amount APO1 is set equal to the peak value, and thereafter decreases as the accelerator pedal depression amount approaches zero.

After the target start-up speed change rate has been calculated in the step S8, the CVT controller 20 sets the target start-up speed change rate as the target speed change rate in a step S11.

Following the processing of the step S11, the CVT controller 20 performs the processing of a step S13.

Meanwhile, when the vehicle is not in the start-up mode in the step S6, i.e., when the actual speed ratio of the CVT 10 is not within a specified range from the maximum speed ratio, the vehicle has completed the start-up operation and entered a normal running mode. In this case as well, the CVT controller 20 calculates the target start-up speed change rate from the accelerator pedal depression amount by referring to the map corresponding to FIG. 10 in a step S14, in the same manner as in the processing of the step S8.

Figure 9:
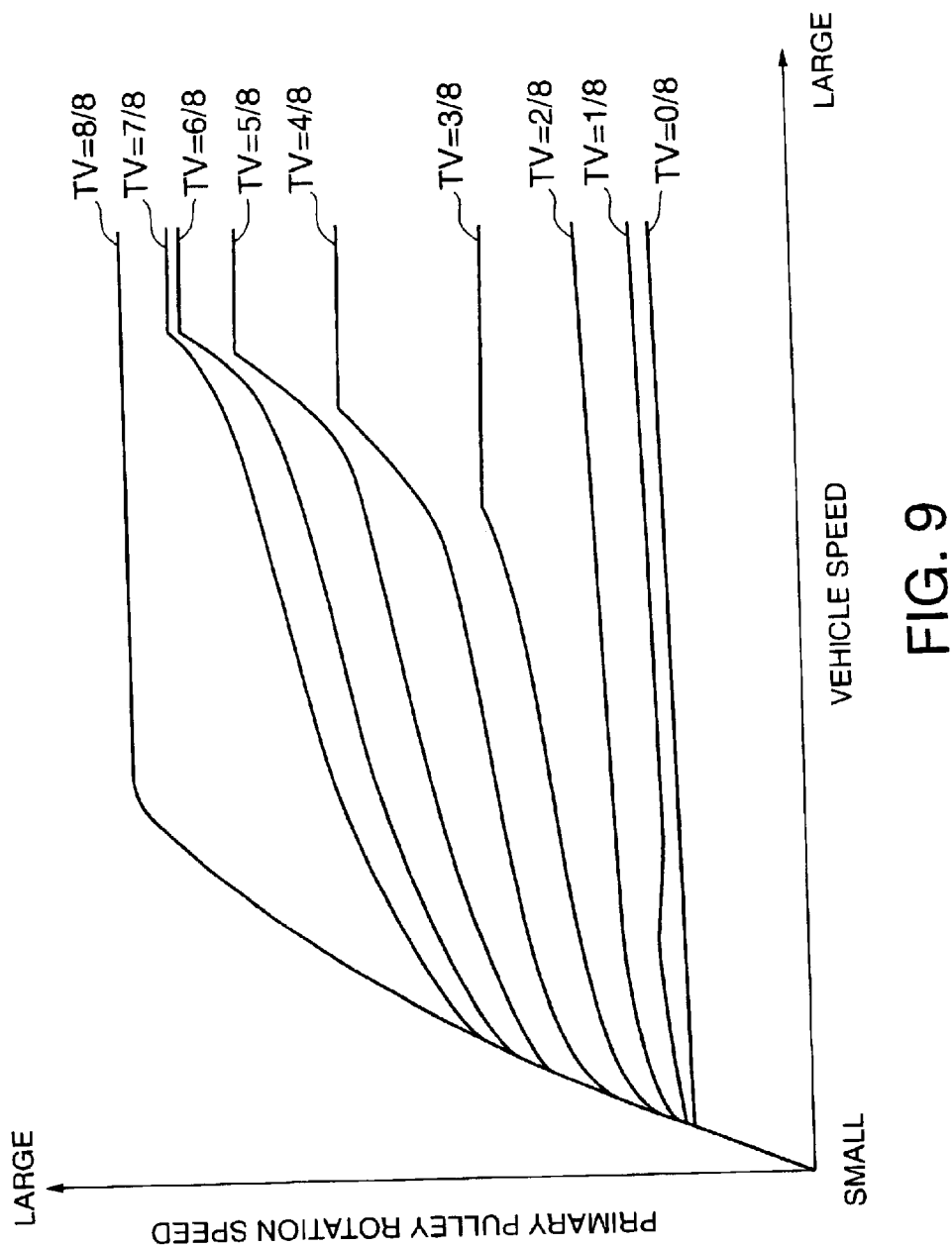
FIG. 9 is a diagram illustrating the characteristics of a speed change schedule stored by the CVT controller.

In a next step S15, the CVT controller 20 calculates a final target speed ratio from the vehicle speed VS and the throttle opening TV of the engine 1 by referring to a speed change schedule of which the characteristics are shown in FIG. 9. This speed change schedule is also prestored in the memory (ROM) of the CVT controller 20.

The vehicle speed VS is proportional to the rotational speed of the secondary pulley 12 of the CVT 10, so it is known from the signals input from the rotation speed sensor 27 as was described above.

The vertical axis of the figure indicates the rotation speed of the primary pulley 11. Accordingly, the slope of a straight line connecting the origin and the point determined from the vehicle speed VS and the throttle opening TV in the figure represents the speed ratio of the CVT 10.

After the final speed ratio has been calculated, the CVT controller 20 calculates the target speed ratio by applying a first-order delay processing to the final speed ratio using time constants that have respectively been set for up-shifting, down-shifting and the down-shifting that accompanies the depression of the accelerator pedal. Then, a value obtained by dividing the difference between the final speed ratio and the target speed ratio by the corresponding time constant is set as the target speed change rate in the normal running mode.

In a next step S16, CVT controller 20 compares the target start-up speed change rate calculated in the step S14 and the target speed change rate for normal running calculated in the step S15. Since both of these values are negative values, the comparison is accomplished by comparing the absolute values.

When the target start-up speed change rate is equal to or greater than the target speed change rate for normal running in the comparison of absolute values in the step S16, the CVT controller 20 sets the target start-up speed change rate as the target speed change rate in the step S11, and thereafter performs the processing of the step S13.

When the target start-up speed change rate is smaller than the target speed change rate for normal running in the comparison of absolute values in the step S16, the CVT controller 20 sets the target speed change rate for normal running as the target speed change rate in the step S12. Following the processing of the step S12, the CVT controller 20 performs the processing of the step S13.

Figure 6:
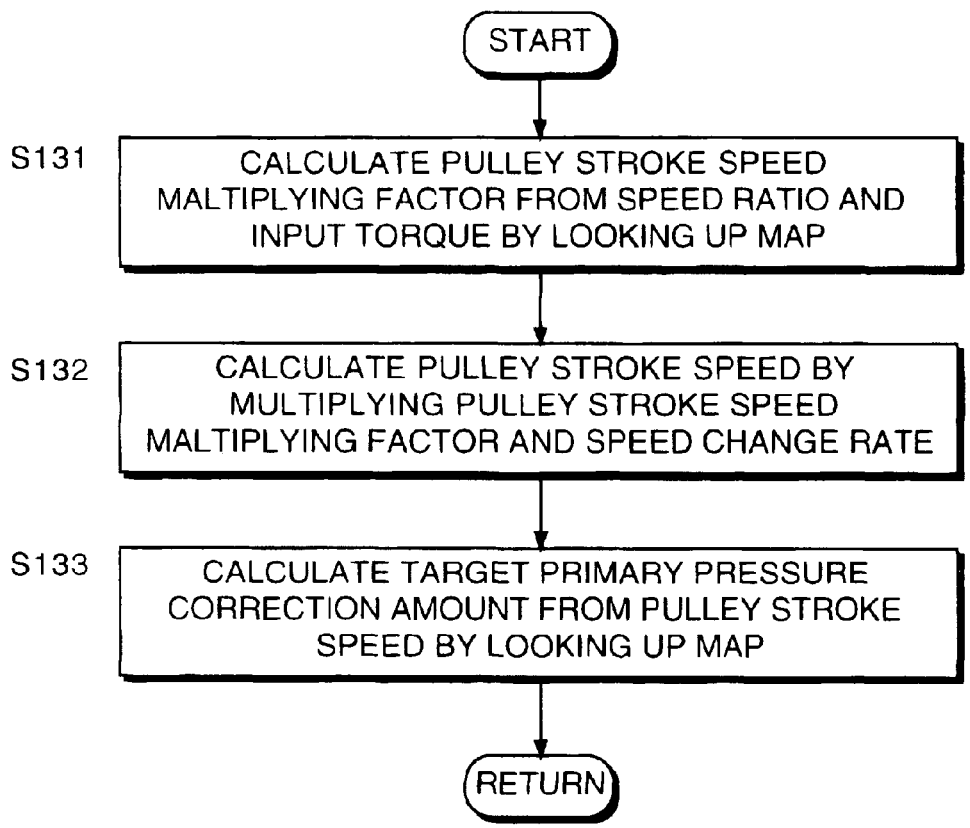
FIG. 6 is a flow chart describing a subroutine for calculating a target primary pressure correction amount executed by the CVT controller.

In the step S13, the target primary pressure correction amount is calculated from the target speed change rate using a subroutine shown in FIG. 6. This subroutine will be described later.

After the target primary pressure correction amount has thus been calculated in the steps S3, S13 or step S18, the CVT controller 20 adds the target primary pressure correction amount to the target primary pressure in a step S4.

In a final step S20, the CVT controller 20 sets whichever is the larger of the target secondary pressure calculated in the step S1 and the target primary pressure corrected in the step S4 as the target line pressure. Then, a line pressure command signal corresponding to the set target line pressure is output to the regulator valve 31. After the processing of the step S20, the CVT controller 20 terminates the routine.

Next, referring to FIG. 4, the subroutine for calculating the target primary pressure and target secondary pressure that is executed in the step S1 of the hydraulic pressure control routine will be described.

First, in a step S101, the CVT controller 20 calculates an input torque of the primary pulley 11. For this purpose, the output torque of the engine 1 is input as a signal into the CVT controller 20 from the engine controller 21. The CVT controller 20 calculates the input torque of the primary pulley 11 by multiplying the output torque of the engine 1 by the torque ratio of the torque converter 2, which is previously known.

In a next step S102, the CVT controller 20 calculates the speed ratio of the belt CVT 10 by dividing the rotation speed of the primary pulley 11 detected by the rotation speed sensor 26 by the rotation speed of the secondary pulley 12 detected by the rotation speed sensor 27. It would also be possible to detect the speed ratio of the belt CVT 10 directly using a single sensor instead of the rotation speed sensors 26 and 27.

Figure 5A:
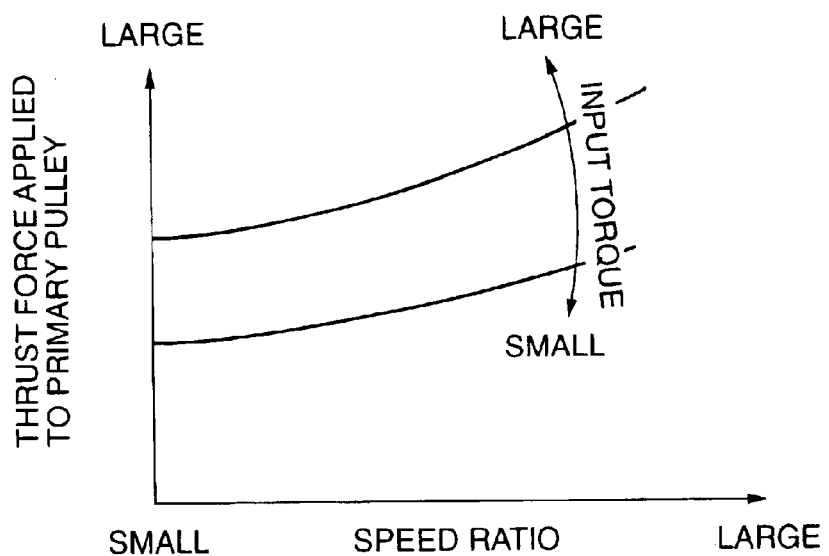
FIGS. 5A and 5B are diagrams illustrating the characteristics of a map of a thrust force of the primary pulley and a map of a thrust force of the secondary pulley stored by the CVT controller.

In a next step S103, the CVT controller 20 calculates a thrust force that is to be applied to the primary pulley 11 from the speed ratio of the belt CVT 10 and the input torque of the primary pulley 11 by referring to a map of which the characteristics are shown in FIG. 5A. The map is prestored in the memory (ROM) of the CVT controller 20. The thrust force that is to be applied to the primary pulley 11 corresponds to a product of the hydraulic pressure that is to be applied to the primary pulley cylinder chamber 11c and the pressure receiving area of the primary pulley 11. According to FIG. 5A, the thrust force that is to be applied to the primary pulley 11 increases as the speed ratio increases. At the same speed ratio, the thrust force that is to be applied to the primary pulley 11 increases as the input torque increases.

Figure 5B:
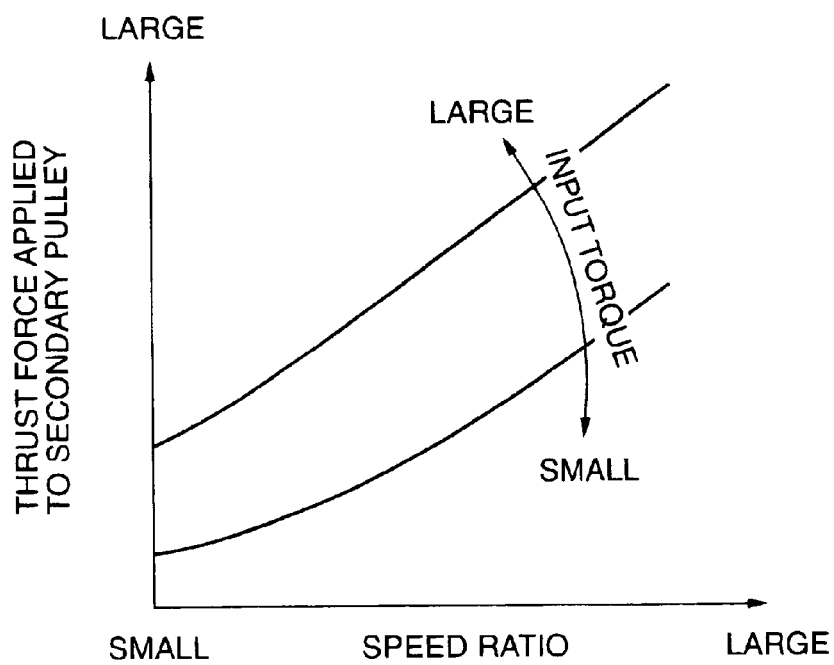

In the step S103, the CVT controller 20 further calculates a thrust force that is to be applied to the secondary pulley 12 from the speed ratio of the belt CVT 10 and the input torque of the primary pulley 11 by referring to a map of which the characteristics are shown in FIG. 5B. The map is prestored in the memory (ROM) of the CVT controller 20. The thrust force that is to be applied to the secondary pulley 12 corresponds to a product of the hydraulic pressure that is to be applied to the secondary pulley cylinder chamber 12c and the pressure receiving area of the secondary pulley 12. According to FIG. 5B, the thrust force that is to be applied to the secondary pulley 12 increases as the speed ratio increases. At the same speed ratio, the thrust force that is to be applied to the secondary pulley 12 increases as the input torque to the primary pulley 11 increases.

Comparing FIGS. 5A and 5B, it is seen that when the speed ratio is small, the thrust force that is to be applied to the primary pulley 11 is greater than the thrust force that is to be applied to the secondary pulley 12 at the same speed ratio and input torque. However, since the thrust force that is to be applied to the secondary pulley 12 has a large increase rate accompanying an increase in the speed ratio, the thrust force that is to be applied to the secondary pulley 12 becomes greater than the thrust force that is to be applied to the primary pulley 11 at the same speed ratio and input torque when the speed ratio exceeds a certain value.

In a next step S104, the CVT controller 20 calculates the target primary pressure by dividing the thrust force that is to be applied to the primary pulley 11 by the pressure receiving area of the primary pulley 11. The CVT controller 20 then calculates the target secondary pressure by dividing the thrust force that is to be applied to the secondary pulley 12 by the pressure receiving area of the secondary pulley 12. After the calculations of the step S104, the CVT controller 20 terminates the subroutine.

Next, referring to FIG. 6, the subroutine for calculating the target primary pressure correction amount that is executed in the step S13 of the hydraulic pressure control routine will be described.

Figure 7:
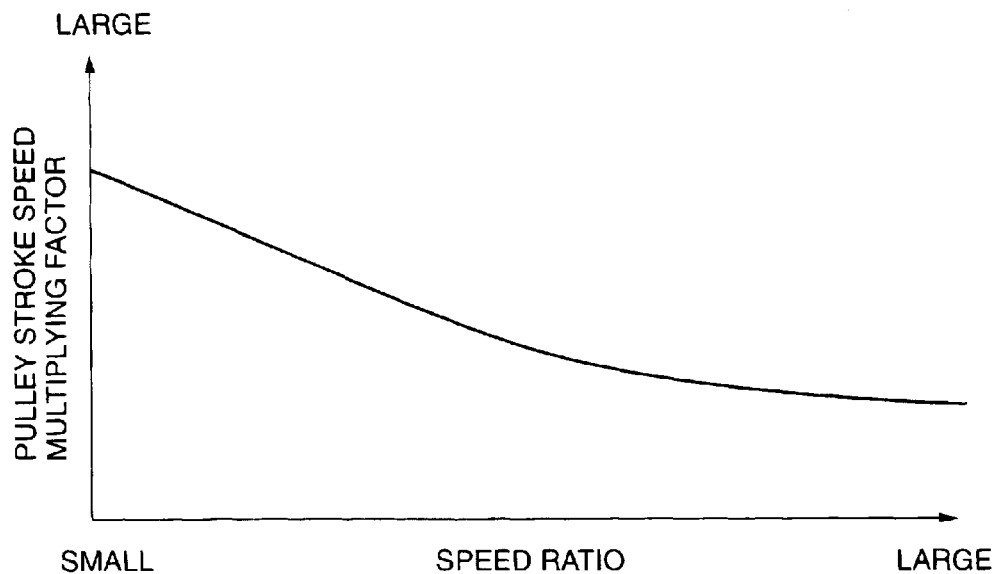
FIG. 7 is a diagram illustrating the characteristics of a map of a pulley stroke speed multiplying factor stored by the CVT controller.

First, in a step S131, the CVT controller 20 calculates the pulley stroke speed multiplying factor from the speed ratio by referring to a map of which the characteristics are shown in FIG. 7. The map is prestored in the memory (ROM) of the CVT controller 20. The pulley stroke speed multiplying factor is a value that is obtained by dividing the pulley stroke speed by the speed ratio of the belt CVT 10. According to FIG. 7, the pulley stroke speed multiplying factor increases as the speed ratio decreases.

In a next step S132, the CVT controller 20 calculates the pulley stroke speed by multiplying the pulley stroke speed multiplying factor by the speed change rate of the CVT 10 that is calculated from the above mentioned actual speed ratio of the CVT 10.

Figure 8:
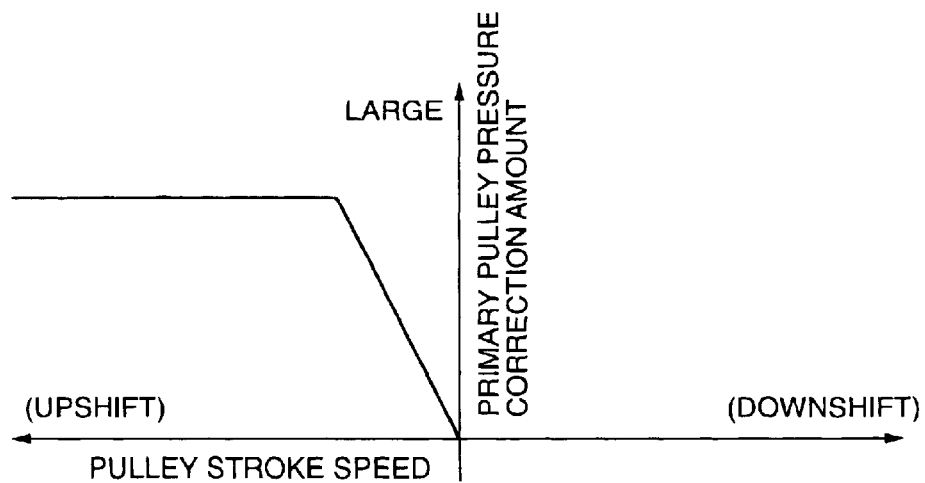
FIG. 8 is a diagram illustrating the characteristics of a map of a primary pressure correction amount stored by the CVT controller.

In a next step S133, the CVT controller 20 calculates the target primary pressure correction amount from the pulley stroke speed by referring to a map of which the characteristics are shown in FIG. 8. The map is prestored in the memory (ROM) of the CVT controller 20. Referring to FIG. 8, the stroke speed of the pulley operating in the up-shifting direction is expressed as a negative value, and the primary pressure correction amount increases as the absolute value of the pulley stroke speed increases until the absolute value of the pulley stroke speed in the up-shifting direction reaches a fixed value from zero. After the calculation of the target primary pressure correction amount in the step S133, the CVT controller 20 terminates the subroutine.

Next, referring to FIGS. 11A through 11G, the variation of the primary pressure and secondary pressure when the vehicle starts to move under the abovementioned hydraulic pressure control performed by the CVT controller 20 will be described.

Figure 11:
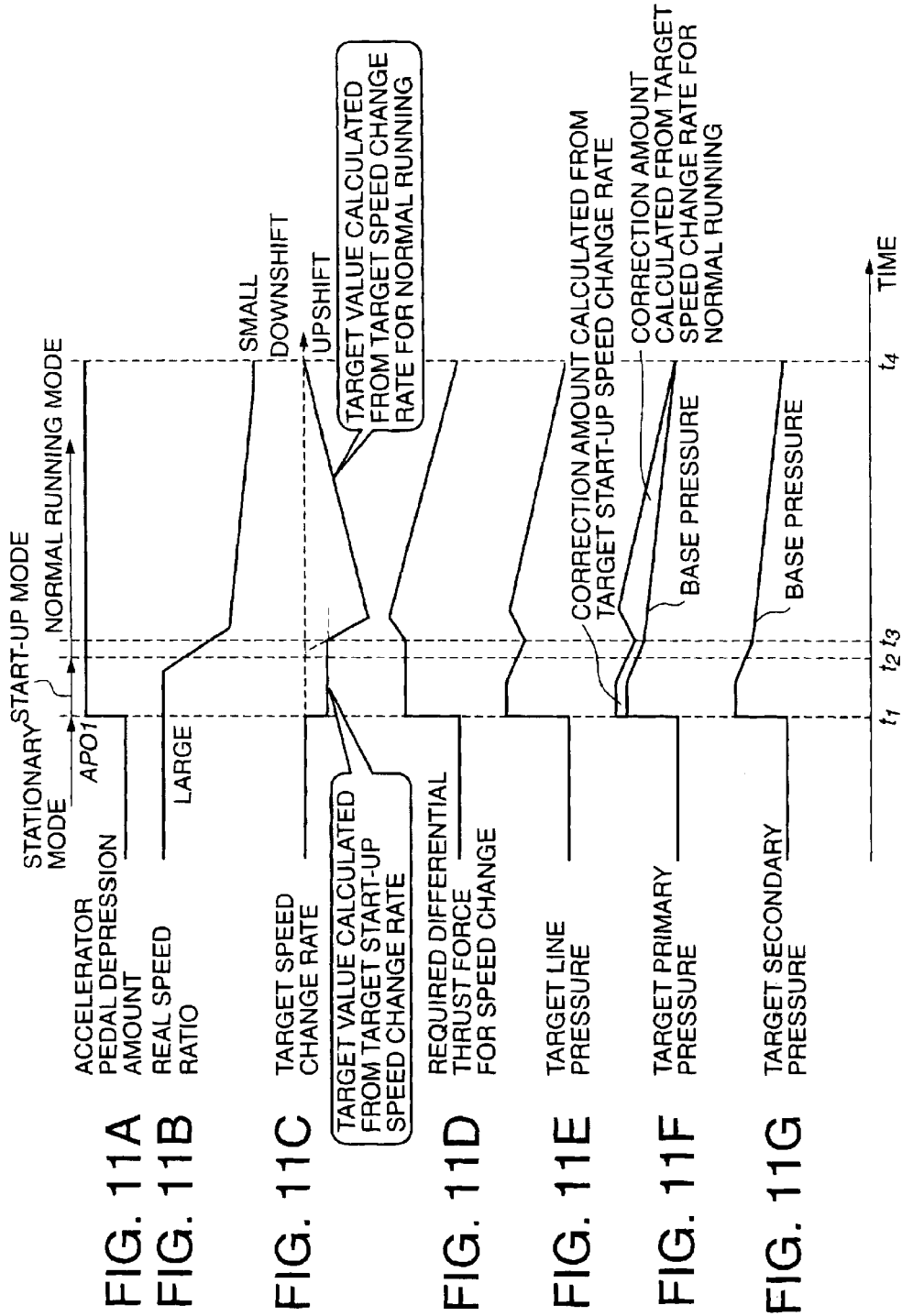
FIGS. 11A through 11G are timing charts illustrating variation in hydraulic pressure occurring when a vehicle starts to move under hydraulic pressure control according to this invention.

In FIG. 11A, the accelerator pedal 24a is depressed to the specified amount of depression APO1 at a time t1 to cause the vehicle to start running while the vehicle is in the stationary mode.

The vehicle starts to move as a result of the depression of the accelerator pedal 24a, and the operation mode of the vehicle shifts from the stationary mode to the start-up mode. The shifting from the stationary mode to the start-up mode occurs with a delay following the depression of the accelerator pedal 24a. However, the difference in these timings has nothing to do with the problem to be solved by this invention. Accordingly, in order to simplify the description, it will be assumed here that the shifting from the stationary mode to the start-up mode is performed simultaneously with the depression of the accelerator pedal 24a at a time t1.

After the vehicle has started to move, the start-up mode is terminated at a time t2, and at a time t3, the absolute value of the target start-up sped change rate drops below the absolute value of the target speed change rate for normal running.

Figure 3A:
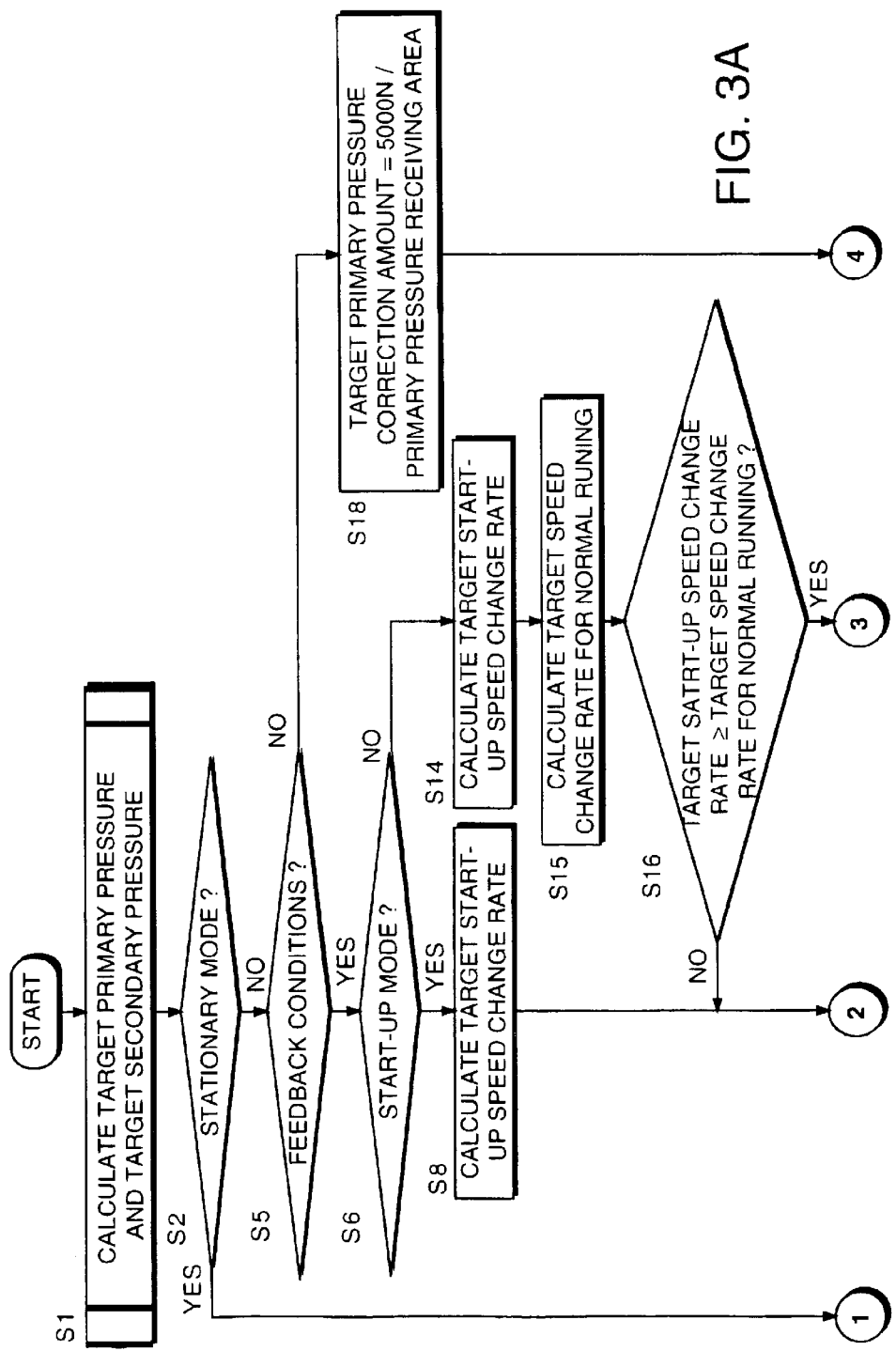
FIGS. 3A and 3B are a flow chart describing a hydraulic pressure control routine executed by a CVT controller according to this invention.
Figure 3B:
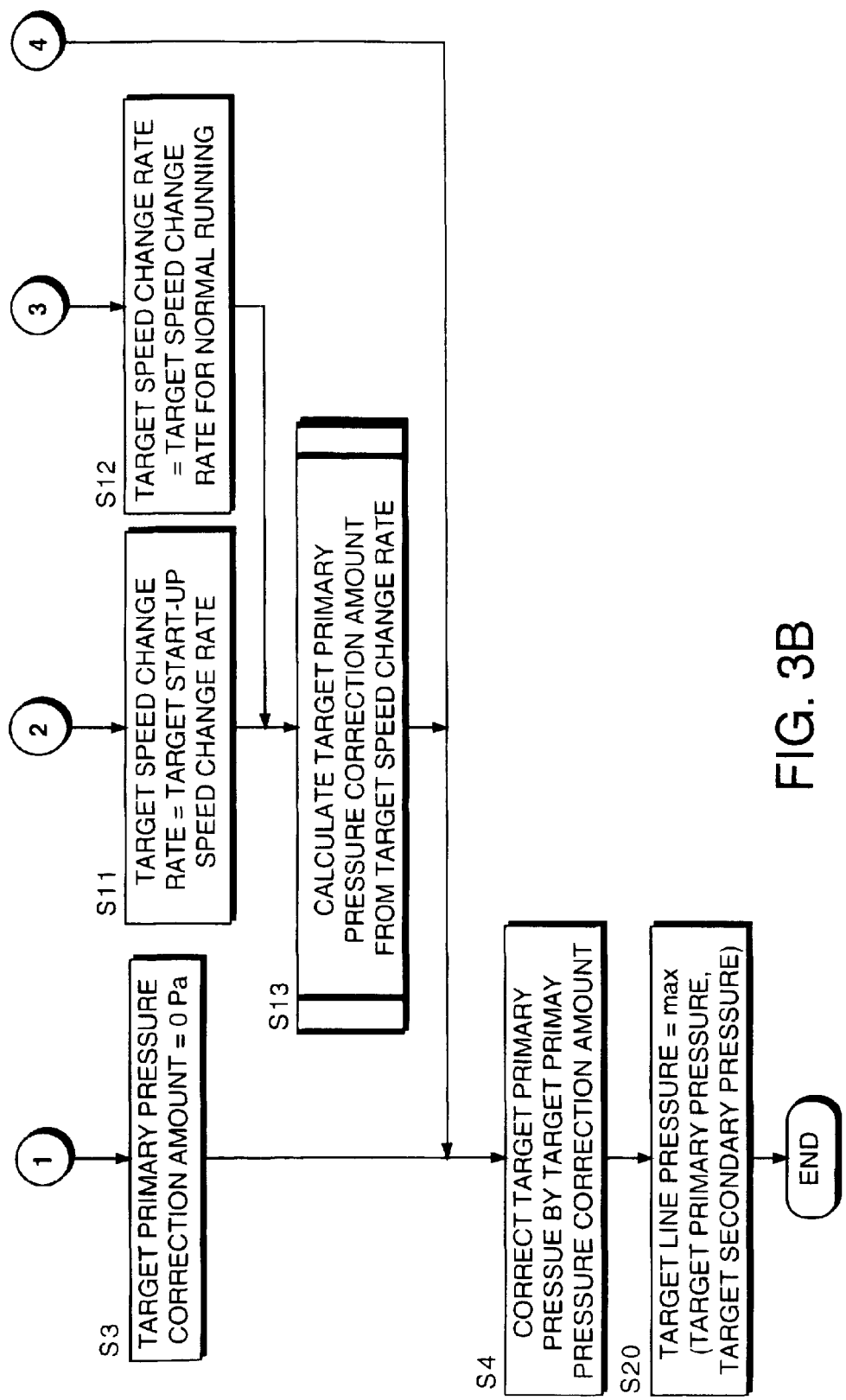

In the hydraulic pressure control routine shown in FIGS. 3A, 3B, which is repeatedly executed during this period, since the mode from time t1 to time t2 is the start-up mode, the target primary pressure correction amount is calculated on the basis of the target start-up speed change rate in the step S13, and a pressure obtained by adding the target primary pressure correction amount to the target primary pressure calculated in the step S1 is set as the corrected target primary pressure. Meanwhile, the target secondary pressure is the value calculated in the step S1, and is the pressure that is required in order to prevent the belt 13 from slipping over the secondary pulley 12 while maintaining the current speed ratio. As is shown in FIGS. 11F and 11G, the target primary pressure and target secondary pressure calculated in the step S1 decrease as the speed ratio of the belt CVT 10 decreases.

Although in the interval from time t2 to time t3, the vehicle is in the normal running mode, the absolute value of the target start-up speed change rate is greater than the absolute value of the target speed change rate for normal running, so a pressure obtained by added the target primary pressure correction amount to the target primary pressure calculated in the step S1 is naturally used as the corrected target primary pressure.

The target start-up speed change rate that is the basis for the calculation of the target primary pressure correction amount is constant as long as the accelerator pedal 24a maintains the specified depression amount APO1. Accordingly, in the interval extending from the time t1 to time t3, a constant value is added to the target primary pressure as the target primary pressure correction amount, as is shown in FIG. 11F.

The target line pressure that is calculated in the step S20 corresponds to the larger of the corrected target primary pressure and the target secondary pressure calculated in the step S1. Accordingly, in the interval from time t1 to time t3, as is shown in FIG. 11E, the corrected target primary pressure is used as the target line pressure.

As a result of the above, in the interval from the time t1 to time t3 immediately after the vehicle has started to move, the target line pressure and the target primary pressure are both corrected to increase. The pressure of the primary pulley cylinder chamber 11c which is controlled by the hydraulic pressure regulating unit 30 on the basis of these increased target values therefore rises rapidly as the vehicle starts to move so that the belt CVT 10 is up-shifted with a good response.

After the time t3, the absolute value of the target start-up speed change rate drops below the absolute value of the target speed change rate for normal running. Accordingly, the target speed change rate for normal running is applied for the target speed change rate, and the target primary pressure is corrected by an increase in pressure using the target primary pressure correction amount calculated in the step S13 on the basis of the target speed change rate for normal running. The target secondary pressure calculated in the step S1 is used as the secondary pressure.

As is shown in FIGS. 11F and 11G, the target primary pressure and target secondary pressure calculated in the step S1 both continue to decrease as the speed ratio decreases due to the up-shifting of the belt CVT 10. The target primary pressure correction amount temporarily increases as a result of the shifting from the target start-up speed change rate to the target speed change rate for normal running.

However, the correction amount decreases as the difference between the final speed ratio and the target speed ratio decreases, and finally it becomes zero at a time t4, when the target speed ration coincides with the final speed ratio.

Thus, according to this invention, the target start-up speed change rate is set according to the accelerator pedal depression amount, and in the start-up mode, the target primary pressure is corrected to increase based on the target start-up speed change rate.

As a result, when the accelerator pedal is depressed to cause the vehicle to start to move, the primary pressure is corrected to increase before the target speed ratio of the belt CVT 10 begins to vary. Accordingly, the actual speed ratio of the belt CVT 10 follows the variation in the target speed ratio with a good response.

If on the other hand the hydraulic pressure control when the vehicle starts to move were performed depending on the speed change rate for normal running, the target speed change rate would vary according to the difference between the final target speed ratio and the target speed ratio. As is indicated in the speed change schedule in FIG. 10, the final target speed ratio immediately after the vehicle has started to move, is equal to the maximum speed ratio. After this state has continued for a short time, the final target speed ratio varies in the up-shifting direction. During this interval, the final target speed ratio and the target speed ratio are therefore equal, and the target speed change rate for normal running is zero.

Since the target speed change rate for normal running is proportional to the difference between the final target speed ratio and the target speed ratio which follows the variation in the final target speed ratio with a first-order delay, the target speed change rate for normal running begins to increase from zero only at a timing in the vicinity of time t2 as indicated by the broken line in FIG. 11C.

Further, it surpasses the target start-up speed change rate only after the time t3. Accordingly, if the target primary pressure correction amount were set on the basis of the target speed change rate for normal running, the primary pressure required for the up-shifting operation of the belt CVT 10 would not be obtained during the period from the time t1 to time t3.

By the setting of the target start-up speed change rate according to this invention, the primary pressure is corrected to increase in synchronism with the accelerator pedal depression to cause the vehicle to start regardless of the final target speed ratio, as is shown in FIG. 11F.

Accordingly, the speed ratio of the belt CVT 10 varies with a good response according to the variation of the final target speed ratio, as shown in FIG. 11B.

Furthermore, even in a control system where smoothing processing is applied to the target speed change rate for normal running, the system does not suffer a speed change lag of the CVT 10 accompanying the smoothing processing, because the target speed change rate when the vehicle starts to move does not depends on the target speed change rate for normal running.

Furthermore, since the line pressure is set equal to the larger of the corrected primary pressure and the secondary pressure, the line pressure also rises with a good response as soon as the accelerator pedal 24a is depressed.

The target start-up speed change rate is set in accordance with the depression amount of the accelerator pedal 24a, so it is set to an appropriate value suited for the vehicle start-up conditions. In other words, when the depression amount of the accelerator pedal 24a is small, the target start-up speed change rate is small, and the target primary pressure correction amount is also small. Accordingly, the increase in the hydraulic pressure when the vehicle starts to move is kept small.

According to this invention, the target start-up speed change rate conversely decreases when the accelerator pedal 24a is depressed beyond the specified depression amount APO1. In the region where the accelerator pedal depression amount is large, a speed change lag caused by stand-by delay of the hydraulic pressure is unlikely to occur, as was described above. Accordingly, in this region, the primary pressure correction amount is reduced by reducing the target start-up speed change rate.

Since the target start-up speed change rate is set according to the accelerator pedal depression amount, an increase in fuel consumption caused by a wasteful rise in the hydraulic pressure can be prevented while eliminating any speed change lag.

According to this invention, the shifting from the target start-up speed change rate to the target speed change rate for normal running is performed when the target start-up speed change rate exceeds the target speed change rate for normal running in the step S1. Therefore, sudden change in the hydraulic pressure accompanying the shifting of the operation mode does not occur and the speed ratio of the belt CVT 10 varies smoothly even during the mode shifting.

Next, referring to FIG. 12, a second embodiment of this invention will be described.

This embodiment relates to the hydraulic pressure control routine. When executing the hydraulic pressure control routine, the controller 20 executes processing of a step S160 shown in FIG. 12 instead of the step S16 of FIG. 3A of the first embodiment. The remaining features of this embodiment are identical to those of the first embodiment.

Figure 12:
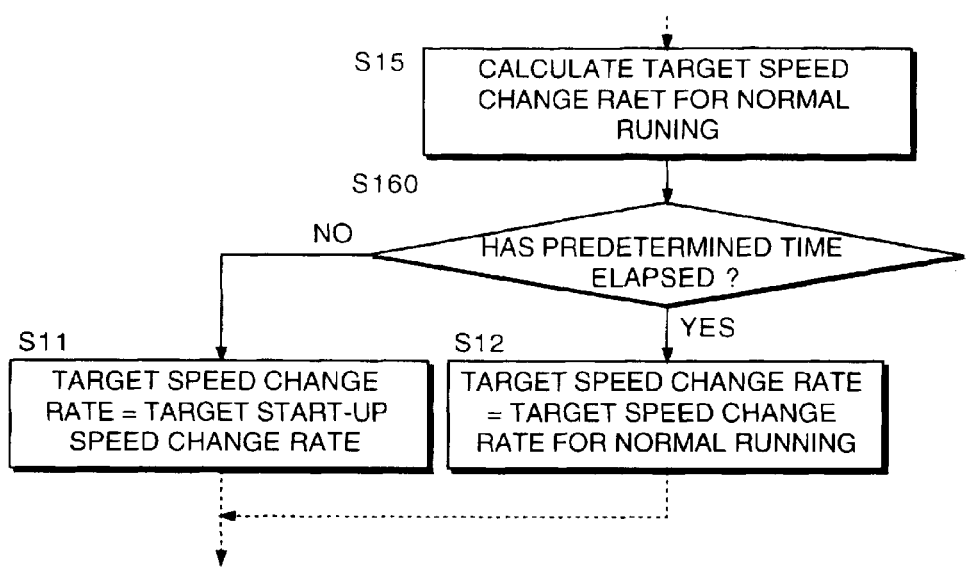
FIG. 12 is a flowchart describing essential parts of a hydraulic pressure control routine executed by a controller according to a second embodiment of this invention.

Referring to FIG. 12, in the step S160, the CVT controller 20 determines whether or not an elapsed time from when the vehicle started to move, which corresponds to the time t1 in FIGS. 11A through 11G, has reached a specified time.

When the elapsed time has not reached the specified time, the controller 20 sets the target start-up speed change rate as the target speed changer rate in the step S11. When the elapsed time has reached the specified time in the step S160, the CVT controller 20 sets the target speed change rate for normal running as the target speed change rate in the step S12.

When the vehicle starts to move on an uphill slope, the acceleration of the vehicle is slower for the same accelerator pedal depression amount than when the vehicle starts to move on a flat road surface. On an uphill slope, therefore, it takes time for the target speed change rate for normal running to exceed the target start-up speed change rate. If the primary pressure continues to increase on the basis of the target start-up speed change rate over a long period of time, however, the fuel consumption will greatly increase.

According to this embodiment, when the elapsed time from t1 reaches the specified time, the target speed change rate automatically switches from the target start-up speed change rate to the target speed change rate for normal running. As a result, a wasteful increase in fuel consumption under special conditions in which a quick acceleration of the vehicle is not possible can be prevented.

The contents of Tokugan 2002-255742, with a filing date of Aug. 30, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the respective embodiments described above, the stationary mode corresponds to the condition in which the vehicle speed VS is less than three kilometers per hour, while the rotational speed NPRI of the primary pulley 11 is less than two hundred revolutions per minute. However, the stationary mode may of course be defined by means of other conditions.

It is also preferable that the target primary pressure correction amount be further corrected in accordance with conditions such as the oil temperature and the like. Specifically, when the oil temperature is out of a specified temperature region, the response characteristics of hydraulic pressure control tend to drop. A further increase in the target primary pressure correction amount will compensate for such a response drop.

In the hydraulic pressure control routines shown in FIGS. 3A, 3B and FIG. 12, the target primary pressure correction amount is calculated as a hydraulic pressure. However, it is possible to calculate the thrust force that is necessary to prevent the belt 13 from slipping over the respective pulleys while maintaining the current speed ratio in the step S1, to calculate the correction amount of the thrust force in the step S13, and finally to convert the sum of the thrust force and the correction amount into a hydraulic pressure.

Furthermore, in the respective embodiments described above, the target speed change rate for normal running is calculated in accordance with the difference between the final target speed ratio and the target speed ratio. However, this invention is not limited by the determination process of the target speed change rate for normal running, and various methods may be applied for determining the target speed change rate for normal running.

In the respective embodiments described above, the parameters necessary for control are detected using respective sensors. However, this invention is not limited by the method used to acquire parameters. This invention is applicable to any types of hydraulic control devices that execute the claimed control using the claimed parameters.

The embodiments of this invention in which an exclusive property or privilege is claimed are defined as follows:

What is claimed is:

1. A hydraulic pressure control device for a continuously variable transmission for a vehicle, the transmission varying a speed ratio at a speed change rate corresponding to a hydraulic pressure, comprising:

a sensor which detects a vehicle speed;
a hydraulic pressure regulating unit which varies the hydraulic pressure supplied to the transmission; and
a programmable controller programmed to:
calculate a target speed change rate according to a predetermined speed change schedule in which the speed ratio varies in an up-shift direction as the vehicle speed increases;
determine after the vehicle has started to move whether or not a specified condition holds;
cause the hydraulic pressure regulating unit, when the specified condition holds, to supply a hydraulic pressure corresponding to the target speed change rate to the transmission; and
cause the hydraulic pressure regulating unit, when the specified condition does not hold, to supply a hydraulic pressure corresponding to a target start-up speed change rate which is larger than the target speed change rate, to the transmission.

2. The hydraulic pressure control device as defined in claim 1, wherein the continuously variable transmission comprises a belt type continuously variable transmission in which a primary pulley and a secondary pulley are connected by a belt, and the speed ratio is varied in accordance with a primary pressure that acts on the primary pulley and a secondary pressure that acts on the secondary pulley, and the controller is further programmed to respectively calculate a steady state primary pressure and a steady state secondary pressure which are required for the primary pulley and the secondary pulley to prevent the belt from slipping over the primary pulley and the secondary pulley, calculate, when the specified condition holds, a target primary pressure by adding a first correction amount which corresponds to the target speed change rate to the steady state primary pressure, and control the hydraulic pressure regulating unit to cause the primary pressure to be equal to the target primary pressure and to cause the secondary pressure to be equal to the secondary steady state pressure.

3. The hydraulic pressure control device as defined in claim 2, wherein the hydraulic pressure control device further comprises a sensor which detects a depression amount of an accelerator pedal of the vehicle, and the controller is further programmed to calculate, when the specified condition does not hold, the target primary pressure by adding a second correction amount which corresponds to the target start-up speed change rate, and control the hydraulic pressure regulating unit to cause the primary pressure to be equal to the target primary pressure and to cause the secondary pressure to be equal to the secondary steady state pressure.

4. The hydraulic pressure control device as defined in claim 3, wherein the target start-up speed change rate is set to take a maximum value at a specified depression amount of the accelerator pedal and to decrease as the depression amount becomes distant from the specified amount, and the controller is further programmed to increase the second correction amount as the target start-up speed change rate increases.

5. The hydraulic pressure control device as defined in claim 2 wherein the primary pulley is connected to an engine of the vehicle, the hydraulic pressure control device further comprises a sensor which detects an opening of a throttle of the engine, and the controller is further programmed to calculate a final speed ratio based on the predetermined speed change schedule according to the opening of the throttle and the vehicle speed, calculate the target speed ratio by applying a predetermined delay processing to the final speed ratio, calculate the target speed change rate according to a difference between the final speed ratio and the target speed ratio, and increase the first correction amount as the target speed change rate increases.

6. The hydraulic pressure control device as defined in claim 2, wherein the controller is further programmed to determine that the specified condition holds when the target speed change rate has become equal to or greater than the target start-up speed change rate.

7. The hydraulic pressure control device as defined in claim 2, wherein the hydraulic pressure regulating unit comprises a line pressure setting valve which sets a line pressure, a primary pressure regulating valve which adjusts the line pressure to the primary pressure, and a secondary pressure adjustment valve which adjusts the line pressure to the secondary pressure, and the controller is further programmed to determine, when an elapsed time from when the vehicle started to move has not reached a predetermined time, a target line pressure equal to the hydraulic pressure corresponding to the target start-up speed change rate, and control the hydraulic pressure regulating unit to cause the line pressure setting valve to set the line pressure equal to the target line pressure.

8. The hydraulic pressure control device as defined in claim 2, wherein the primary pulley is connected to an engine of the vehicle which is controlled by an engine controller, the hydraulic pressure control device further comprises a sensor which detects an actual speed ratio of the continuously variable transmission and the controller is further programmed to calculate the steady state primary pressure and the steady state secondary pressure based on a torque of the engine which is input from the engine controller and the actual speed ratio of the transmission.

9. The hydraulic pressure control device as defined in claim 1, wherein the controller is further programmed to determine that the specified condition holds when an elapsed time from when the vehicle started to move reaches a predetermined time.

10. A hydraulic pressure control device for a continuously variable transmission for a vehicle, the transmission varying a speed ratio at a speed change rate corresponding to a hydraulic pressure, comprising:

means for detecting a vehicle speed;

means for varying the hydraulic pressure supplied to the transmission;

means for calculating a target speed change rate according to a predetermined speed change schedule in which the speed ratio varies in an up-shift direction as the vehicle speed increases;

means for determining after the vehicle has started to move whether or not a specified condition holds;

means for causing the hydraulic pressure varying means, when the specified condition holds, to supply a hydraulic pressure corresponding to the target speed change rate to the transmission; and means for causing the hydraulic pressure varying means, when the specified condition does not hold, to supply a hydraulic pressure corresponding to a target start-up speed change rate which is larger than the target speed change rate, to the transmission.

11. A hydraulic pressure control method for a continuously variable transmission for a vehicle, the transmission varying a speed ratio at a speed change rate corresponding to a hydraulic pressure supplied from a hydraulic pressure regulating unit, the method comprising:

determining a vehicle speed;

calculating a target speed change rate according to a predetermined speed change schedule in which the speed ratio varies in an up-shift direction as the vehicle speed increases;

determining after the vehicle has started to move whether or not a specified condition holds;

causing the hydraulic pressure regulating unit, when the specified condition holds, to supply a hydraulic pressure corresponding to the target speed change rate to the transmission; and causing the hydraulic pressure regulating unit, when the specified condition does not hold, to supply a hydraulic pressure corresponding to a target start-up speed change rate which is larger than the target speed change rate, to the transmission.

* * * * *